July 31, 1934.   O. J. MOBLEY   1,968,463
AGRICULTURAL HAND IMPLEMENT
Filed April 18, 1932

Inventor
O. J. MOBLEY
By
Attorney

Patented July 31, 1934

1,968,463

UNITED STATES PATENT OFFICE 1,968,463

AGRICULTURAL HAND IMPLEMENT

Ora J. Mobley, Texarkana, Ark., assignor to Edward Durell, Columbus, Ohio

Application April 18, 1932, Serial No. 606,000

1 Claim. (Cl. 306—41)

This invention is directed to an improvement in hoes and the like, and more particularly to a combination socket and shank wherein the ferrule is tapered down to snugly fit the shank of the handle to insure a substantially water-proof joint between the ferrule and shank.

In ordinary constructions of this type, the hoe or other implement handle shank is inserted in the wooden handle and the ferrule placed over a reduced end of the handle and generally turned down at the end, primarily with a view to avoiding splitting of the handle in the use of the implement. In such constructions, the end of the ferrule which surrounds the shank is generally spaced an appreciable distance from the metal shank, and as implements of this character are ordinarily left out in the weather, rain and the moisture in the air very readily penetrate beneath the ferrule and reach the wooden handle, with the result of such deterioration of the wooden handle end as to render the implement useless until a new handle is applied.

Furthermore, in the use of the implement, the mud and water of the ground will work between the ferrule and shank and reach the wooden handle, with a speedy destruction of the handle end.

The primary object of the present invention is to extend the ferrule well beyond the end of the wooden handle and to draw down by any appropriate mechanical operation the end of the ferrule so that the free end of the latter fits the metal shank snugly and for an appreciable distance lengthwise the shank. By this construction there is a sealing relation between the ferrule and the shank and the end of the wooden handle, which is, of course, within the ferrule, is fully protected against the admission of any water, mud or the like at the shank end of the ferrule.

The invention is illustrated in the accompanying drawing, wherein:—

Figure 1:
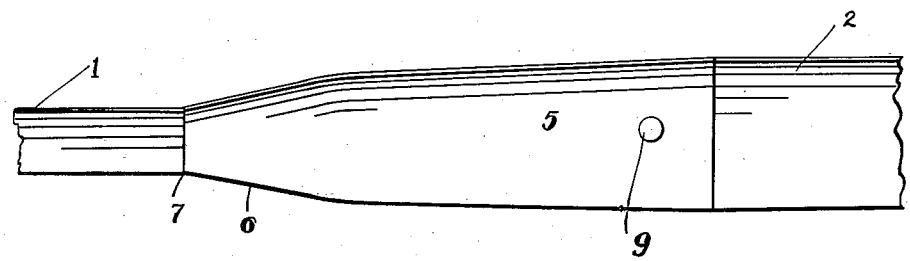
Figure 1 is a view in side elevation showing a portion of the implement shank, the wooden handle and the improved ferrule.
Figure 2:
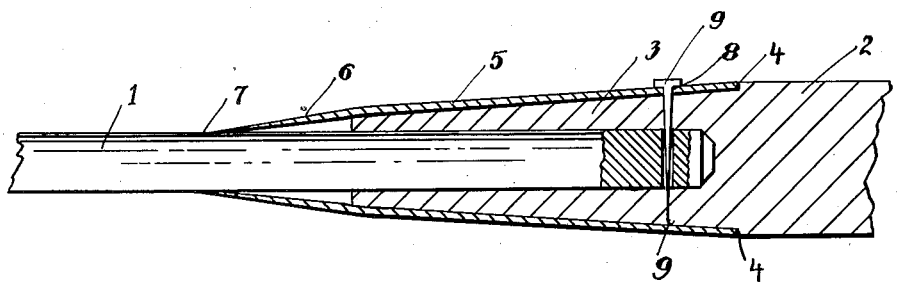
Figure 2 is a longitudinal central sectional view of the same.

The essential feature of the present invention is the ferrule, it being understood that the implement shank 1, which is ordinarily a metal rod, is inserted in the end of the wooden handle 2, the end of the handle being reduced at 3 to receive the ferrule, with the reduced portion providing a shoulder 4 against which the upper end of the ferrule abuts, with the thickness of the ferrule corresponding to the depth of the shoulder so that the ferrule and handle present a uniform even appearance at that joint.

The ferrule 5 of the present invention is generally conventional, in that it is formed of a metallic tube tapered to more or less snugly fit the reduced portion of the handle, the upper open end of the ferrule abutting against the shoulder 4 of the handle and constituting a flush connection with the handle at this point.

The improvement in the ferrule of the present invention is more particularly concerned with that end of the ferrule which overlies the juncture between the shank 1 and the end of the wooden handle in which the shank is fitted. At this point the ferrule, which is ordinarily of slightly greater length than the usual ferrule, is forced down uniformly on that portion beyond the end of the wooden handle toward and into contact with the metal shank, the free terminal portion of the ferrule being forced into intimate contact with the exterior of the shank, with this contacting portion having an appreciable lengthwise bearing on the shank. In other words, the end of the ferrule adjacent the juncture of the shank and wooden handle is gradually converged toward the shank at 6, the free terminal of the converging portion being forced into intimate contact with the shank at 7, with the contacting portion having an appreciable lengthwise bearing on the shank.

The contacting portion of the ferrule is arranged to have a substantial sealing cooperation with the shank and thus prevent any water, mud or the like from getting between the shank and ferrule and reaching the end of the wooden handle, with the obvious deleterious result on the latter. Of course, the improved shank is initially constructed so that the converging end is formed during the formation of the ferrule so that following the introduction of the shank through the ferrule, the application of the wooden handle and the positioning of the ferrule on the handle, it is necessary to only spin or otherwise force down the extreme end of the converging portion of the ferrule into close embracing contact with the shank. The mechanical means by which the result is accomplished is unimportant so long as the terminal of the converging portion of the ferrule is forced into proper sealing relation with the shank. The ferrule is secured against separation from the handle by any convenient means, such as a nail or the like, indicated at 9, which may be driven through a hole 8 formed in the ferrule and take into the wooden handle. The ferrule may be forced from its position whenever it is necessary to renew the handle in any obvious manner after withdrawing the securing nail, the nail passing also through a diametric opening in the shank so that it also resists withdrawal of the shank.

In the use of the improved ferrule, the end of the wooden handle is fully and completely protected against rotting or shortening of its effective use incident to the accumulation of water or mud and the like within the ferrule. Therefore, with the improved ferrule, the implement, notwithstanding hard usage in wet ground and exposure to the weather when not in use, will maintain the end of the wooden handle substantially dry and will, therefore, tend to a very much longer life in the connection between the implement shank and the handle and avoid the incident expense of renewal of the wooden handle and the connection of the implement thereto, which is under present conditions a rather frequent occurrence, for investigation has shown that where the end of the wooden handle is exposed to the damp soil, rain or dampness in any form, the handle usually suffers to an extent to require its renewal after a single season's use of the implement. With the improved ferrule and the complete and adequate protection of the end of the wooden handle, the juncture between the shank and handle is ordinarily ample for the full possible life of the implement itself, barring, of course, accidental breakage or direct improper usage.

I claim:—

In combination, a wooden handle, an implement shank seating in a recess extending longitudinally of the handle, the handle terminating abruptly to present a shoulder relative to the shank, a ferrule comprising a metallic section snugly embracing the handle throughout substantially that length thereof corresponding to the inserted depth of the shank, said ferrule being integrally extended over and beyond the abrupt termination of the handle toward and into contact with the shank, the extension of the ferrule beyond the abrupt shoulder of the handle being gradually inclined with respect to the shank to thereby provide an enclosed space between the ferrule and shank in advance of the abrupt termination of the handle, that end of the ferrule engaging the shank being reduced in thickness and snugly embracing the shank to provide a substantial seal, the end of the ferrule which cooperates with the shank having its exterior surface substantially merged into the exterior surface of the shank to thereby avoid abrupt projection beyond the shank, the spacing of the engaging portions of said ferrule and shank in advance of the handle serving to avoid contact of dirt and the like during use of the implement with the end of the handle.

ORA J. MOBLEY. [L. S.]